(12) United States Patent
Krenzer et al.

(10) Patent No.: US 11,077,504 B2
(45) Date of Patent: Aug. 3, 2021

(54) STEP DRILL

(71) Applicant: Mapal Fabrik für Präzisionswerkzeuge Dr. Kress KG, Aalen (DE)

(72) Inventors: Ulrich Krenzer, Zirndorf (DE); Serkan Topal, Altenstadt (DE)

(73) Assignee: MAPAL FABRIK FUR PRAZISIONSWERKZEUGE DR. KRESS KG, Aalen (DE)

( * ) Notice: Subject to any disclaimer, the term of this patent is extended or adjusted under 35 U.S.C. 154(b) by 0 days.

(21) Appl. No.: 16/313,967

(22) PCT Filed: Jul. 12, 2017

(86) PCT No.: PCT/EP2017/067635
§ 371 (c)(1),
(2) Date: Dec. 28, 2018

(87) PCT Pub. No.: WO2018/011314
PCT Pub. Date: Jan. 18, 2018

(65) Prior Publication Data
US 2019/0224759 A1    Jul. 25, 2019

(30) Foreign Application Priority Data

Jul. 14, 2016 (DE) .......................... 102016212910.4
Aug. 3, 2016 (DE) .......................... 102016214386.7

(51) Int. Cl.
*B23B 51/00* (2006.01)
*B23B 47/34* (2006.01)
*B23B 51/02* (2006.01)

(52) U.S. Cl.
CPC ............ *B23B 51/009* (2013.01); *B23B 47/34* (2013.01); *B23B 51/02* (2013.01); *B23B 2251/245* (2013.01)

(58) Field of Classification Search
CPC . B23B 51/009; B23B 51/02; B23B 2251/241; B23B 2251/242;
(Continued)

(56) References Cited

U.S. PATENT DOCUMENTS 805,170 A * 11/1905 Thomas ................. B23Q 11/10
408/56
1,747,117 A    2/1930 Klein
(Continued)

FOREIGN PATENT DOCUMENTS

DE         20108179 U1    8/2001
DE    102012012479 A1    9/2013
(Continued)

OTHER PUBLICATIONS

International Search Report for PCT/EP2017/067635 ISA/EP dated Jan. 24, 2019 with English Translation.
(Continued)

*Primary Examiner* — Eric A. Gates
*Assistant Examiner* — Paul M Janeski
(74) *Attorney, Agent, or Firm* — Stephen T. Olson; Harness, Dickey & Pierce, P.L.C.

(57) ABSTRACT

A step drill includes a distal end, an opposite proximal end, a drill tip and at least one drill step. The drill tip has a tip at the distal end of the step drill and comprises a first number of geometrically defined cutters, each of which is paired with a first flute and lies on an imaginary first circular line about a longitudinal axis of the step drill. The imaginary first circular line has a first radius. The at least one drill step is arranged at a distance from the distal end and has an end face with a second number of geometrically defined cutters each
(Continued)

of which is paired with a second flute and lies on an imaginary second circular line that runs about the longitudinal axis of the step drill and has a second radius. The first radius is smaller than the second radius. The first flutes of the drill tip and the second flutes of the drill step merge in a region, which is arranged at a greater distance from the distal end than the end face of the drill step, and form a single flute.

20 Claims, 6 Drawing Sheets

(58) Field of Classification Search
CPC ......... B23B 2251/245; B23B 2251/244; Y10T 408/906; Y10T 408/9065; Y10T 408/905
See application file for complete search history.

(56) References Cited

U.S. PATENT DOCUMENTS

| | | | |
|---|---|---|---|
| 2,389,909 A | * | 11/1945 | Hofbauer ............ B23B 51/0081 408/224 |
| 2005/0053438 A1 | | 3/2005 | Wetzl et al. |
| 2009/0047080 A1 | * | 2/2009 | Schweighofer ......... B23B 51/02 408/59 |
| 2012/0082523 A1 | * | 4/2012 | Bozkurt ................ B23B 51/009 408/59 |

FOREIGN PATENT DOCUMENTS

| | | | | |
|---|---|---|---|---|
| DE | 102014108513 | A1 | | 12/2015 |
| EP | 1260296 | A1 | * 11/2002 | ............ B23B 51/02 |
| EP | 1512476 | A2 | | 3/2005 |
| EP | 2845672 | A1 | | 3/2015 |
| JP | S61-100307 | A | | 5/1986 |
| WO | WO-01/10587 | A1 | | 2/2001 |
| WO | WO-2014/191216 | A1 | | 12/2014 |
| WO | 2015118684 | A1 | | 8/2015 |

OTHER PUBLICATIONS

International Search Report for PCT/EP2017/067635, ISA/EP, Rijswijk, NL, dated Oct. 19, 2017, with English translation attached.

Office Action received for the Japanese Patent Application No. 2019-500859, dated Feb. 16, 2021, 10 pages (3 pages of English Translation and 7 pages of Original Copy).

* cited by examiner

STEP DRILL

CROSS-REFERENCE TO RELATED APPLICATIONS

This application is a 371 U.S. National Stage of International Application No. PCT/EP2017/067635, filed Jul. 12, 2017. This application claims priority to German Patent Applications Nos. DE10 2016 212 910.4, filed on Jul. 14, 2016 and DE 10 2016 214 386.7, filed on Aug. 3, 2016. The entire disclosures of the above applications are incorporated herein by reference.

FIELD

The invention relates to a step drill.

BACKGROUND

Step drills of the type addressed herein are known. Among others, they comprise a drill tip with a number of geometrically defined cutters and at least one drill step, having a greater outer diameter than the drill tip and also comprising a number of cutters. The cutters of both the drill tip and the drill step are assigned flutes which are used to discharge the shavings which are removed by the cutters of the drill tip or the cutters of the drill step and which are present, when a step drill is used, i.e., when a workpiece is processed. A safe and low-friction discharge of the shavings is the prerequisite for a safe functioning of the step drill. Particularly with step drills of the type addressed herein, the shavings control and discharge can prove very difficult because the shavings angles of the individual steps differ from one another. In addition, the cutting speeds of the cutters of the drill tip and the at least one drill step deviate greatly from one another. Therefore, it is frequently very difficult to select the cutting conditions, i.e., the cutting speed and the feed rate, such that it results for all cutters in a shavings formation required for a safe shavings removal.

Step drills are realized with different designs:

On the drill tip, the simple step drill has the same number of flutes as cutters, i.e., usually two. The manufacture of this design is relatively cost-efficient and offers a good stability of the tool. When processing a workpiece, the shavings removed by both the drill tip and the drill step are discharged in the same flutes. The shavings removed by the drill step thus reach the shavings removed by the drill tip and mix with them in the flutes. When drilling ductile, long-chipping workpiece materials, there is thus a collision at the drill steps of the shavings removed by the drill tip and the shavings removed by the drill step tip. As a result, the shavings discharge from the drill tip is frequently blocked and said drill tip might even break.

The so-called subland step drill, i.e., a step drill, where both the cutters of the drill tip and the cutters of the drill step have their own flutes, offers a significant improvement because, due to the additional flutes for the drill cutters, a shavings collision of the type described above is prevented. The shavings of the drill tip and the drill cutters flow in different flutes and cannot block each other. However, a great disadvantage of the geometry of such subland step drills is the significant weakening of the drill due to the additional flutes. When compared to the simple step drills of the type addressed above, such drills have a significantly lower stability. The difficult shavings discharge of the drill cutters from a great depth, i.e., at great drilling depths, is a further disadvantage of the subland step drill. The relatively small additional flutes, i.e., the flutes of the drill cutters, can pose a real problem.

Therefore, the problem addressed by the invention is that of creating a step drill that avoids said disadvantage.

SUMMARY

For solving this problem, a step drill is proposed which comprises a distal and a proximal end, as well as with a drill tip which comprises at the distal end a tip, having a number of geometrically defined cutters. Herein, geometrically defined cutters refers to cutters which are created by forming two adjacent surfaces, for example, by a grinding process, and the cutting line of said surfaces forms the cutter. Such cutters thus differ from those provided, for example, for grinding tools which comprise individual grinding bodies serving as cutters. Flutes, also called main flutes, are associated with the cutters of the drill tip, said flutes being used to discharge shavings removed by the cutters. The cutters are delimited by cutting edges which lie on an imaginary first circular line about a longitudinal axis, which is also called the first cutting circle. It comprises a first radius. The drill further comprises at least one drill step that is arranged at a distance from the distal end and comprises an end face, which faces in the direction of the distal end, with a number of geometrically defined cutters, each of which paired with a flute. It is thus a subland step drill. The flutes of the drill cutter are also called additional flutes. The cutting edges of the drill step lie on an imaginary second circular line about the central axis of the step drill with a second radius, wherein the first radius is smaller than the second radius in order to realize the step drill. The second circular line is also called the second cutting circle. The first cutting circle has a first diameter, and the second cutting circle has a second diameter, wherein the diameters, in the usual manner, are twice that of the corresponding radius, and wherein the second diameter is greater than the first diameter.

The step drill is characterized in that the flutes of the drill tip and the flutes of the drill step merge in a region, which is arranged at a greater distance from the distal end than the end face of the drill step, and form a single flute.

With this design, it is possible that shavings, which are generated during the processing of a workpiece and removed by the cutters of the drill tip, and shavings, which are removed by the drill step, are at first discharged separately from the area, in which the step drill meshes with the workpiece. In the area of the additional flutes, the removed shavings are formed and discharged from the processing area of the drill step. Only after a more or less orderly shavings flow has formed in the additional flutes, these shavings are combined with those of the drill tip, which are discharged by the main flute. The shavings removed in the area of the drill step do thus not reach the shavings flow running in the main flute immediately after the removal from a workpiece. The shavings discharged in the main and additional flutes are combined only at a distance from the end face of the drill step, i.e., at a greater distance to the distal end than the distance of the end face of the drill step from the distal end of the step drill. Since the shavings of the drill tip and the drill step initially flow in separate paths, they cannot block one another. Since the flutes of the drill tip and the drill step are combined to form a single common flute, the step drill is less weakened than would be the case if two separate main and additional flutes were to be formed over its entire length.

The step drill proposed herein thus has a significantly higher stability than a convention subland step drill. Since both flutes are combined to a single flute at a greater distance from the distal end of the step drill, the shavings discharge is also safely ensured, when producing greater drilling depths by means of the step drill addressed herein.

A preferred embodiment of the step drill provides that the spin incline of the flutes associated with the drill step is greater that the spin incline of the flutes associated with the drill tip. In a simple manner, this design of the step drill provides for the flutes of the drill tip and the drill step to converge. The fact that the flutes associated with the shavings removed by the drill tip, and the flutes associated with the shavings removed by the drill step converge, results in a reduced weakening of the step drill without having to fear disadvantages with regard to the shavings discharge. Instead, it is also provided that shavings from deep bores are optimally dischargeable due to the converging flutes.

A further preferred embodiment is characterized in that the core of the flutes associated with the drill step tapers, wherein the core diameter, proceeding from the end face of the drill step in the direction of the proximal end of the step drill, becomes smaller. Due to this design, the shavings removed by the step drill have more free space to be discharged effectively.

A further preferred embodiment provides that the core of the flutes associated with the drill tip increases in size. This also increases the stability of the step drill.

A particularly preferred embodiment of the step drill is characterized in that the core of the flutes associated with the drill tip increases in size in an area that is arranged at a greater distance to the distal end of the step drill than the end face of the drill step. This core is thus enlarged in an area, in which the diameter of the core associated with the flutes of the drill step tapers. As a result, the space, in which shavings of both the drill tip and the drill step can be discharged, is enlarged, and the stability of the step drill is increased. The enlargement of the core associated with the flutes of the drill tip and/or the tapering of the core associated with the flutes of the drill step is preferably continuous, and so load peaks of the step drill during the processing of a workpiece are prevented.

A further preferred embodiment of the step drill is characterized in that, at the end of the flutes which faces away from the distal end, the core diameter of the flutes associated with the drill tip approximates, preferably corresponds to, the core diameter of the flutes associated with the drill step. In other words: In an area adjoining the end face of the drill step in proximal direction, the core associated with the flutes of the drill step is provided with a diameter that is greater, preferably significantly greater, than the diameter of the core associated with the flutes of the drill tip. In a step drill according to the invention, it is provided that the core diameter of the flutes associated with the drill tip is smaller than in the area of the flutes associated with the drill step. For that purpose, the core diameters are also selected on the basis of the difference between the outer diameter of the step drill in the area of the drill tip, particularly the first diameter of the first cutting circle, and in the area of the drill step, particularly the second diameter of the second cutting circle: If the difference between the outer diameters is small, the core diameter of the drill step is greater by the factor >1.0 to 1.5 than the core diameter of the drill tip. In case of greater differences between the outer diameters, the factor is 2.0 to 2.5. In case of extreme differences between the outer diameters, the core associated with the flutes can have a diameter that is three times greater than the diameter of the flutes associated with flutes of the drill tip.

With increasing distance from the end face of the drill step, the core of the drill step diameter decreases, while the core diameter of the core of the drill tip becomes increasingly larger. Eventually, the core diameters of the two cores are of equal size, and so the flutes of the drill tip and the flutes of the drill step merge entirely.

A preferred embodiment of the step drill is characterized in that, between the flutes associated with the drill step, tunnels are formed, the width of which—proceeding from the end face of the drill step in the direction of the proximal end of the step drill—increases. As a result of this design, the stability of the step drill, proceeding from the end face of the drill step in the direction of the proximal end of the step drill, is increased.

A development of the invention provides that the main flutes and the additional flutes merge at a distance from the cutting circle, which is measured along the central or longitudinal axis of the step drill and which is at least 1.5 times that of the second diameter of the second cutting circle and no more than 5 times that of the second diameter. Preferably, the distance is at least twice that of the second diameter and no more than 4 times that of the second diameter, preferably, it is 3 times that of the second diameter.

Overall, it is apparent that the stability of the step drill proposed herein increases due to the merging of the flutes associated with the drill tip and the drill step and also because of the specific design of the tunnels proceeding from the end face of the drill step in the direction of the proximal end of the step drill.

BEST DESCRIPTION OF THE DRAWINGS

In the following, the invention shall be explained in more detail using the drawing.

DETAILED DESCRIPTION

Figure 1:
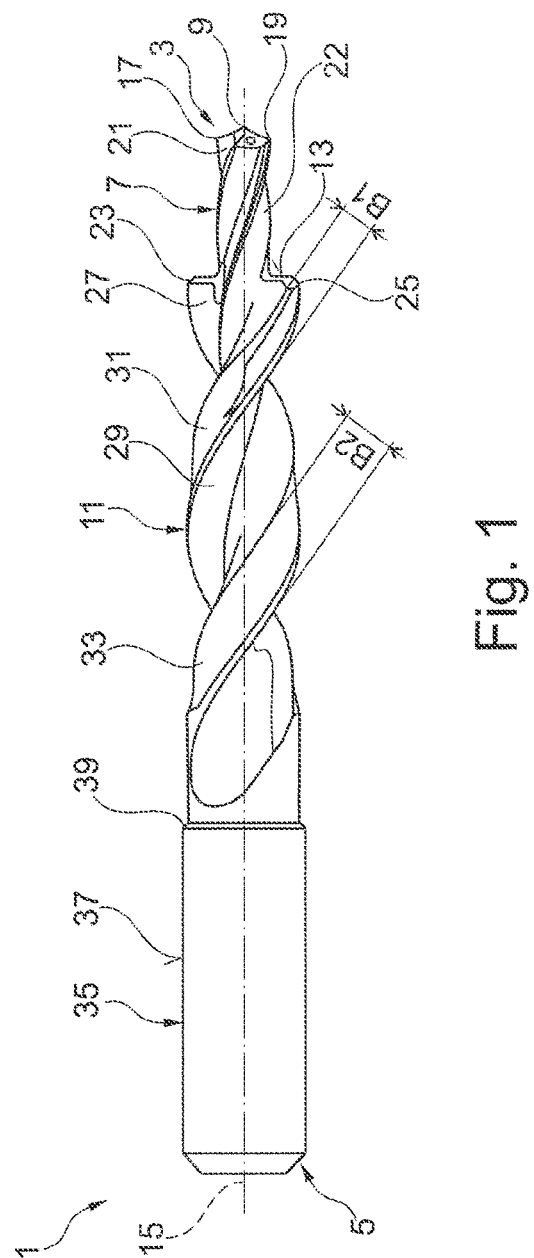
FIG. 1 shows a side view of the step drill.

FIG. 1 shows a step drill 1 comprising a distal end 3 and an opposite proximal end 5, as well as a drill tip 7 that has a tip 9 at the distal end 3, and a drill step 11 arranged at a distance from the distal end 3 and comprising an end face 13 which faces the distal end 3.

At the tip 9 of the drill tip 7, a number of geometrically defined cutters is provided. In the embodiment depicted herein, FIG. 1 shows a first cutter 17 above a longitudinal axis 15 of the step drill 1 as well as an opposite second cutter 19. Each cutter is paired with a flute. FIG. 1 shows the flute 21 associated with the first cutter 17 which is used to discharge shavings removed by the first cutter 17. The drawing also shows the flute 22 associated with the second cutter.

The area of the end face 13 of the drill step 11 is also provided with a number of cutters, wherein the embodiment depicted herein has a first cutter 23, which lies above the longitudinal axis 15, and an opposite second cutter 25. The two cutters 23 and 25 are each paired with their own flutes which do not coincide with the flutes associated with the first and second cutter 17, 19 of the drill tip 7, i.e., they are formed separately from said previous flutes. FIG. 1 shows the flute 27 associated with the first cutter 23, and the flute 29 associated with the second cutter 25.

The first and second cutter 17 and 19 of the drill tip 7 are arranged on an imaginary first circular line (not depicted) with a first radius, which essentially lies on a plane, on which the longitudinal axis 15 of the step drill 1 stands perpendicularly. Correspondingly, the first and second cutter 23 and 25 of the drill step 11 are arranged on an imaginary second circular line (not depicted) with a second radius, which essentially lies on a plane, on which the longitudinal axis 15 stands perpendicularly. It is assumed only by way of example that the two imaginary circular lines each essentially lie in a plane, on which the longitudinal axis 15 of the step drill 1 stands perpendicularly. This is to be assumed, when the two cutters 17 and 19 of the drill tip 7, and 23 and 25 of the drill step 11—as seen looking in the direction of the longitudinal axis 15 of the step drill 1—are at the same level. Basically, it is also possible to axially offset the two cutters of the drill tip 7 or the drill step 11.

The first radius of the first circular line is smaller than the second radius of the second circular line, and so the first diameter of the first cutting circle of the drill tip 7 is smaller than the second diameter of the second cutting circle of the drill step 11. In this manner, the step drill 1 shown herein is realized.

The step drill 1 is designed as a so-called subland step drill because the cutters 17 and 19 of the drill tip 7, and the cutters 23 and 26 of the drill step 11 are each paired with their own flutes. In a herein depicted embodiment of a step drill 1 which, in addition to the drill tip 7, has only one drill step 11, four flutes are thus provided overall.

It is quite possible that a further drill step is provided at a distance from the end face 13 of the herein depicted drill step 11 as seen looking in the direction of the proximal end 5.

FIG. 1 shows that between the flute 27 associated with the first cutter 23 of the drill step 11 and the flute 29 associated with the second cutter 25 of the drill step 11, a first tunnel 31 is formed. Correspondingly, a second tunnel is formed between flute 29 and flute 27.

The herein described design of the step drill 1 with two tunnels 31 and 33 is realized because the drill step 11 has two cutters. If three cutters are provided, three tunnels are realized correspondingly. These relationships are generally known, and so they do not have to be explained in further detail.

In an area near the end face 13 of the drill step 11, the two tunnels 31 and 33 have a first width B1 which becomes larger in the further course of the tunnel in the direction of the proximal end 5 of the step drill 1, and has a second width B2 at a distance from the end face 13. Preferably, the tunnel width increases continuously in order to prevent load peaks during the operation of the step drill 1.

The embodiment of the step drill 1 shown in FIG. 1 thus comprises the tip 9 of the drill tip 7 at its right distal end 3. In the area of the opposite proximal end 5, the step drill 1 is provided with an area which is used to couple the step drill 1 with a drive device, for example, with the spindle of a drilling machine. In this case, for example, the area is formed by a cylindrical shaft 35. The circumferential surface 37 of the shaft 35 can be provided with a flat section (not depicted), in the area of which a fastening screw can engage in order to clamp the shaft 35 non-rotatably in the spindle of the drilling machine, and in a given rotational position. The design of the fastening areas of drills, even step drills, is known, and so they do not have to be explained in further detail.

The circumferential surface 37 of the shaft 35 transitions into the drill step 11 via a step 39 designed herein as a chamfer. In the embodiment depicted herein, said step is provided by way of example. However, it can readily be omitted.

Figure 2:
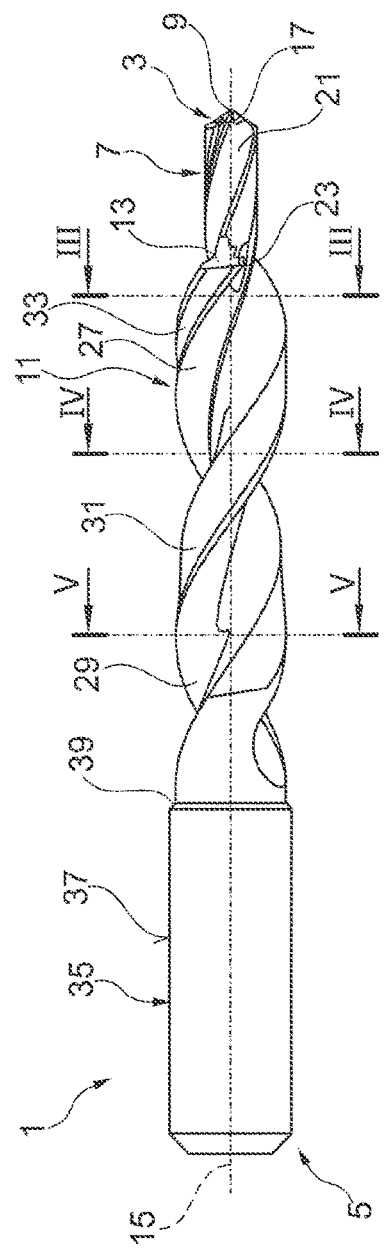
FIG. 2 shows a side view of the step drill shown in FIG. 1 which was rotated about its longitudinal axis by 90°.

FIG. 2 shows a side view of the step drill 1 shown in FIG. 1. However, compared to FIG. 1, the step drill in FIG. 2 was rotated by 90°, and so, the first cutter 23 of the drill step 11, for example, faces the observer of FIG. 2. Similar and functionally similar elements are denoted with the same reference signs, and insofar, reference is herewith made to the previous description. FIG. 2 shows that the drill tip 7 has a tip 9, which comprises a first cutter 17 that also faces the observer of FIG. 2. The first cutter 17 associated with the first cutter 17 of the drill tip 7, which also faces the observer, is clearly shown. The associated flute 21 runs from the tip 9, provided at the distal end of the step drill 1, to the left in the direction of the proximal end of the step drill 1. Correspondingly, the flute 27, which is associated with the first cutter 23 of the drill step 11, runs from the end face 13 of the drill step 11 also to the left in the direction of the proximal end 5.

FIG. 2 shows the tunnels 33 and 31 which were described using FIG. 1.

FIG. 2 shows three dashed vertical lines denoted with the numbers III, IV, and V, which indicate sectional planes, on which the longitudinal axis 15 of the step drill 1 stands.

Figure 3:
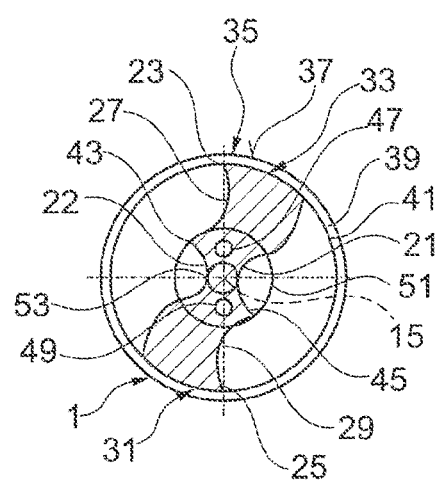
FIG. 3 shows a first cross-section perpendicular to the longitudinal axis of the step drill near the end face of the drill step.

FIG. 3 shows a cross-section of the step drill 1, which runs along the line III-III in FIG. 2. The outer circular line in FIG. 3 shows the circumferential surface 37 of the shaft 35; the inner circular line 41 shows the transition of the drill step 11 to the step 39 which leads to the circumferential surface 37. Otherwise, similar parts are denoted with similar reference signs, and so reference is made to the previous description.

In the cross-section according to FIG. 3, the first cutter 23 of the drill step 11 lies at the top, and its second cutter 25 lies at the bottom. In addition, the flute 27 associated with the first cutter 23, and the flute 29 associated with the second cutter 25 can be clearly seen. Clearly shown are also the flute 21 associated with the first cutter 17 of the drill tip 7, and the flute 22 associated with the second cutter 19 of the drill tip 7.

FIG. 3 clearly shows that the flutes 21 and 23 or 27 and 29 associated with the drill tip 7 and the drill step 11, respectively, are separated from one another by a protrusion 43 or 45; the protrusion 43 separates the flute 27 from the flute 22, and correspondingly, the protrusion 45 separates the flute 29 from the flute 21. In other words, the shavings removed by the cutters 17 and 19 run in the flutes 21 and 22 of the drill tip associated with the cutters. The shavings removed from the cutters 23 and 25 of the drill step 11 run in the associated flutes 27 and 29 and do not mix with the shavings of the flutes 21 and 22 associated with the drill tip 7.

The step drill 1 can be provided with coolant/lubricant channels 47 and 49 which can be arranged here in a dashed vertical diameter line. The supply of a drill, also a step drill 1 of the type addressed herein, with coolants/lubricants is known, and so it does not have to be explained in further detail. However, it must be noted that the cooling channels 7 and 49 preferably open into the area of the tip 9 at the distal end 3 of the step drill 1, and so exit openings for the coolant/lubricant are realized in said area.

FIG. 3 also shows the tunnels 31 and 33.

The core associated with the flutes 27 and 29 of the drill step 11 is indicated by a first circle 51 running about the central axis 15. The core associated with the flutes 21 and 22 of the drill tip 7 is indicated by a further circle 53 running about the central axis 15. It can be clearly seen that the core of the drill tip, indicated by the circle 53, is smaller than the core of the drill step 11, indicated by the circle 51. By way of example, the diameter of the circle 51 is three times larger than that of the circle 53. The exact proportions are ultimately not crucial. It is essential that the core indicated by the circle 51 is significantly thicker than the core indicated by the circle 53.

FIG. 4 again shows a cross-section of the step drill 1, wherein the sectional plane here runs along the line IV-IV shown in FIG. 2. Similar and functionally similar elements are denoted with the same reference signs, and insofar, reference is herewith made to the previous description.

Figure 4:
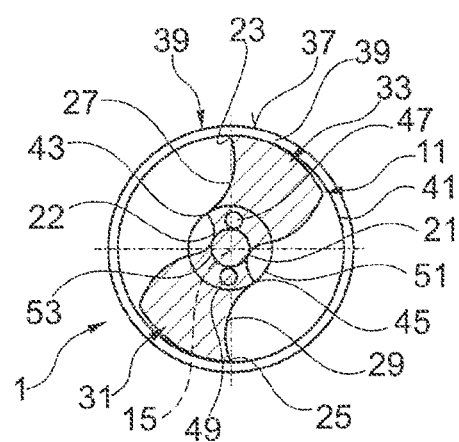
FIG. 4 shows a second cross-section of the step drill at a greater distance to the end face of the drill step than in FIG. 3.

In the cross-sectional view according to FIG. 4, it can be seen that the protrusion 43 between the flute 27 and the flute 22 is smaller than the one in FIG. 3. In addition, it moved clockwise on the circle 51. Correspondingly, the protrusion 45 between the flute 29 and the flute 21 has also become smaller and moved clockwise on the circular line 51. It is important that the separation between the flutes 27 and 22 and the flutes 29 and 21 is no longer designed to be so decisive. Therefore, a first mixing of the shavings discharged in the flutes 27 and 22 or 29 and 21 can take place.

It can also be seen that the width of the tunnels 31 and 33 has become larger, when compared to the cross-sectional view of FIG. 3.

Figure 5:
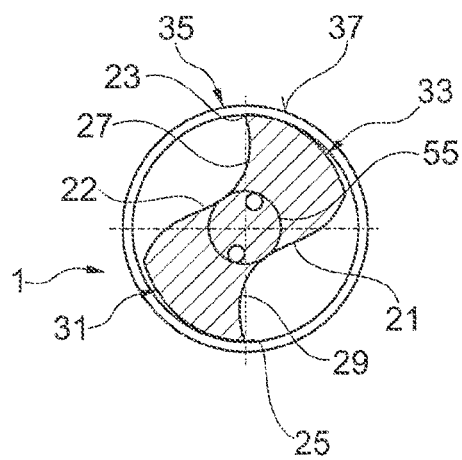
FIG. 5 shows a further cross-section of the step drill at a greater distance to the end face of the drill step than in FIG. 4.

FIG. 5 shows a cross-section of the step drill 1 along the line V-V shown in FIG. 2. Similar and functionally similar elements are denoted with the same reference signs, and insofar, reference is herewith made to the previous description.

It becomes apparent that in an area, which lies at a greater distance from the end face 13 of the drill step 11 than the areas, in which the cutting lines III-III and IV-IV lie, the protrusions 43 and 45, which are still noticeable in FIGS. 3 and 4, have entirely disappeared in the area of the cross-section according to FIG. 5. The flutes 27 and 22 or 29 and 21 thus form a single flute because they are no longer separated by the protrusions 43 and 45, but merge instead.

FIG. 5 further shows that the circles 51 and 53 shown in FIGS. 4 and 4 have merged into one circle 55. As the previous cross-sections according to FIGS. 3 and 4 show, this is because the diameter of the core of the drill step 11 indicated by the circle 51, proceeding from the end face 13, has tapered to the left, i.e., in the direction of the proximal end 5 of the step drill, while the diameter of the core of the drill tip 7 has become larger from right to left, i.e. from the end face 13 of the drill step 11 in the direction of the proximal end 5. In the area of the cross-section shown in FIG. 5, it is provided that the core diameters have converged, are preferably designed to be the same size.

FIG. 5 also shows that the width of the tunnels 31 and 33 has increased further.

Figure 6:
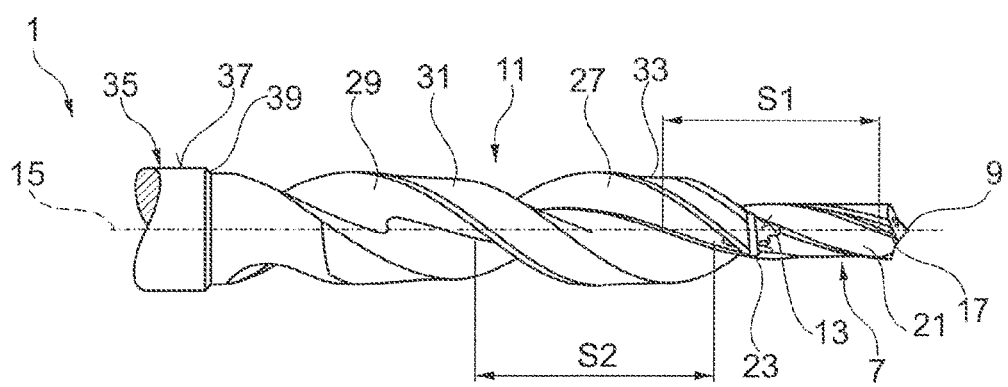
FIG. 6 shows a magnified side view of the front part of the step drill according to FIG. 2.

FIG. 6 shows magnified the front area of the step drill 1 in a position shown in FIG. 2. Here, the shaft 35 is shown broken off. Similar and functionally similar elements are denoted with the same reference signs, and insofar, reference is herewith made to the previous description.

In FIG. 6, half of the spin incline of the flute 21 associated with the drill tip 7 is indicated by means of an auxiliary line S1. Half of the spin incline of the flute 27 associated with the drill step 11 is indicated by means of a second auxiliary line S2.

The flutes 21 and 22 associated with the cutters 21 and 23 have the same spin incline. Correspondingly, the spin incline associated with the flutes 27 and 29 of the cutters 23 and 25 is identical.

It is apparent that the spin incline of the flutes 27 and 29 associated with the drill step 11 is greater than the spin incline of the flutes 21 and 22 associated with the drill tip 7. This design is selected to realize a merging of the flutes 27 and 22 or 29 and 21, as can be seen from the cross-sections according to FIGS. 3 to 5.

It is apparent from the descriptions that the step drill according to the invention is designed as a subland step drill and comprises two flutes 21 and 22 associated with the drill tip 7, and two flutes 27 and 29 which are separate from the flutes 21 and 22 and associated with the drill step 11. It has basically become apparent that a step drill with four flutes is weakened such that in some circumstances, a break can occur. However, from the descriptions, particularly from the cross-sections according to FIGS. 3 to 5, it becomes apparent that the diameter of the core associated with the flutes 21 and 22 of the drill tip 7 has a core diameter which increases in the area of the end face 13 of the drill step 11 in the direction of the proximal end 5 of the step drill 1. Simultaneously, the core diameter of the core associated with the flutes 27 and 29 of the drill step 11 decreases in this area. Simultaneously, the width of the tunnels 31 and 33, proceeding from the end face 13 of the drill step 11 in the direction toward the distal end 5 of the step drill 1 increases. As a result, the flute spaces of the drill tip 7 and the drill step 11 merge and overall have a reduced space requirement than is the case with known subland step drills. Due to the increasing width of the tunnels 31 and 33, the stability of the step drill 1, proceeding from the end face 13 of the drill step 11 in the direction of the distal end 5 of the step drill 1, also increases.

When comparing the cross-sections according to FIGS. 3 to 5, it is apparent that the cross-sectioned area (here shaded) of the step drill 1, proceeding from the end face 13 of the drill step 11 in the direction of the proximal end 5 of the step drill, increases continuously. In other words: The main part of the step drill 1, proceeding from the end face 13 of the drill step 11 in the direction of the proximal end 5 of the step drill 1, becomes thicker and sturdier. As a result, an increased stability of the step drill 1 is realized. However, due to the merging of the flutes 27 and 22 or 29 and 21, the space provided for the shavings removed by the cutters 17 and 19 of the drill tip 7 and the cutters 23 and 25 of the drill step 11 is still large enough to ensure a problem-free shavings discharge—even at great drilling depths.

The flutes 21, 22 of the drill tip 7, i.e. the main flutes, and the flutes 27, 29 of the drill step 11, i.e. the additional flutes, merge preferably at a distance, measured in the direction of the longitudinal axis 15 of the step drill 1, from the imaginary second circular line of the drill step 11, thus the second cutting circle, wherein the distance is at least three times that of the second radius and no more than ten times that of the second radius. Preferably, the distance is at least four times that of the second radius and no more than eight times that of the second radius, preferably six times that of the second radius.

The invention claimed is:

1. A step drill comprising:
   a distal end and an opposite proximal end;
   a drill tip having a tip at the distal end of the step drill and comprises a first number of geometrically defined cutters, each of which is paired with a corresponding first flute and lies on an imaginary first circular line about a longitudinal axis of the step drill, the imaginary first circular line having a first radius; and
   at least one drill step arranged at a distance from the distal end and having an end face with a second number of geometrically defined cutters, each paired with a corresponding second flute and lying on an imaginary second circular line that runs about the longitudinal axis of the step drill and has a second radius, wherein the first radius is smaller than the second radius,
   wherein the first flutes of the drill tip and the second flutes of the drill step merge in a region which is arranged at a greater distance from the distal end than the end face of the drill step, and form a single flute,
   wherein a second flute core of the second flutes of the drill step tapers, such that a second flute core diameter, proceeding from the end face of the drill step in a direction of a proximal end of the step drill, becomes smaller, and
   wherein, at an end of the first flutes facing away from the distal end, a first flute core diameter of the first flutes of the drill tip approximates a second flute core diameter of the second flutes associated with the drill step, such that the first flutes and the second flutes merge.

2. The step drill according to claim 1, a first spin incline of the second flutes of the drill step is greater than a second spin incline of the first flutes of the drill tip.

3. The step drill according to claim 1, wherein a first flute core of the first flutes of the drill tip increases in the direction of the proximal end.

4. The step drill according to claim 3, wherein the first flute core of the first flutes of the drill tip increases in an area which has a greater distance to the distal end of the step drill than the end face of the drill step.

5. The step drill according to claim 3, wherein, at an end of the first flutes which faces away from the distal end, a first flute core diameter of the first flutes of the drill tip corresponds to the second flute core.

6. The step drill according to claim 1, further comprising tunnels between the second flutes of the drill step, the tunnels formed such that a width of the tunnels, proceeding from the end face of the drill step in the direction of the proximal end of the step drill, increases.

7. The step drill according to claim 1, wherein the first flutes of the drill tip and the second flutes of the drill step merge at a distance, measured in a direction of the longitudinal axis of the step drill, from the imaginary second circular line of the drill step, which is at least three times that of the second radius and no more than ten times that of the second radius.

8. The step drill according to claim 7, wherein the distance is at least four times that of the second radius and no more than eight times that of the second radius.

9. The step drill according to claim 7, wherein the distance is at least four times that of the second radius and no more than six times that of the second radius.

10. The step drill according to claim 1, wherein in an axial portion between the end face of the drill step and the proximal end the first flutes and the second flutes are formed separately from one another, and wherein the region where the flutes merge is located proximal to the axial portion.

11. The step drill according to claim 10, wherein the first flutes are separated from the second flutes by corresponding protrusions in the axial portion and no longer separated by the corresponding protrusions in the region where the first and second flutes merge.

12. The step drill according to claim 10, wherein a first core associated with the first flutes is smaller than a second core associated with the second flutes.

13. The step drill according to claim 10, wherein an axial extension of the axial portion is larger than a third of a distance between the end face and the tip.

14. The step drill according to claim 10, wherein the second flutes are larger than a radial extension of the first flutes in the axial portion adjacent to the end face.

15. The step drill according to claim 1, wherein the second flutes are concavely shaped in a radial direction.

16. The step drill according to claim 15, wherein the second flutes are continuously curved in the radial direction.

17. The step drill of claim 1, wherein the first flutes of the drill tip are a deep helical groove configured to guide chips produced by the first number of geometrically defined cutters in a direction towards the proximal end of the cutting tool.

18. The step drill of claim 17, wherein the second flutes of the drill step are a deep helical groove configured to guide chips produced by the second number of geometrically defined cutters in a direction initially different than that of the chips guided by the first flutes of the drill tip.

19. The step drill of claim 1, wherein the second flutes of the drill step and the first flutes of the drill step merge at a region of transition, wherein the first flutes and the second flutes coexist for a length of the region of transition.

20. A step drill comprising:
   a distal end and an opposite proximal end;
   a drill tip having a tip at the distal end of the step drill and including a first number of first geometrically defined cutters, each of the first geometrically defined cutters paired with a corresponding first flute and lying on an imaginary first circular line about a longitudinal axis of the step drill, the imaginary first circular line having a first radius; and
   at least one drill step arranged at a distance from the distal end and having an end face with a second number of second geometrically defined cutters, each of the second geometrically defined cutters paired with a corresponding second flute and lying on an imaginary second circular line that runs about the longitudinal axis of the step drill and has a second radius, wherein the first radius is smaller than the second radius,
   wherein the first flutes of the drill tip and the second flutes of the drill step merge in a region which is arranged at a greater distance from the distal end than the end face of the drill step, and form a single flute, the second flutes being helically arranged around the longitudinal axis and, in a cross-sectional view, having an at least partially round profile,
   wherein a second flute core of the second flutes of the drill step tapers, such that the second flute core, proceeding from the end face of the drill step in a direction of a proximal end of the step drill, becomes smaller, and
   wherein, at an end of the first flutes facing away from the distal end, a first flute core diameter of the first flutes of the drill tip approximates a second flute core diameter of the second flutes associated with the drill step, such that the first flutes and the second flutes merge.

* * * * *